Figure 1:
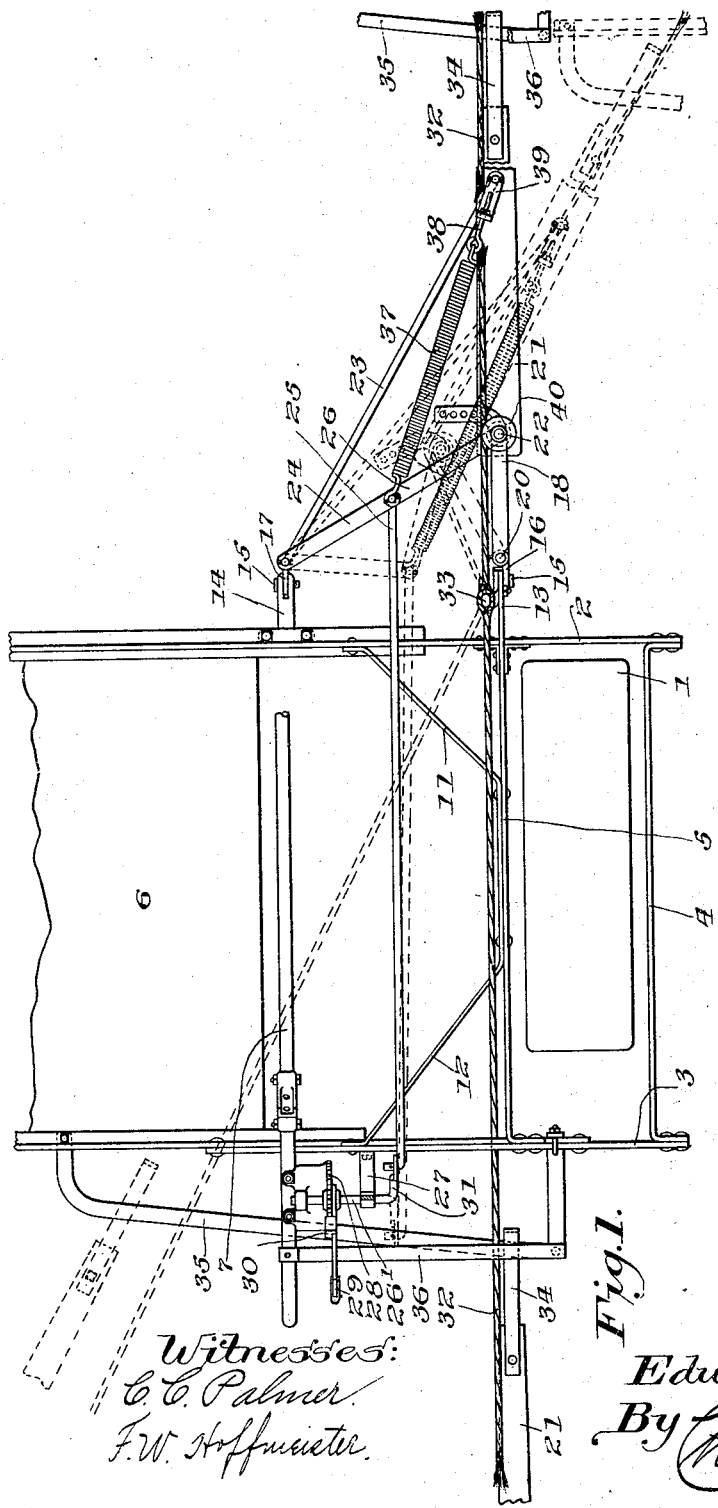

E. W. BURGESS.
DRAFT DEVICE.
APPLICATION FILED APR. 30, 1914.

1,200,075.

Patented Oct. 3, 1916.
2 SHEETS—SHEET 1.

Witnesses:
C. C. Palmer
F. W. Hoffmeister

Inventor:
Edward W. Burgess
By Chas. E. Lord
Atty.

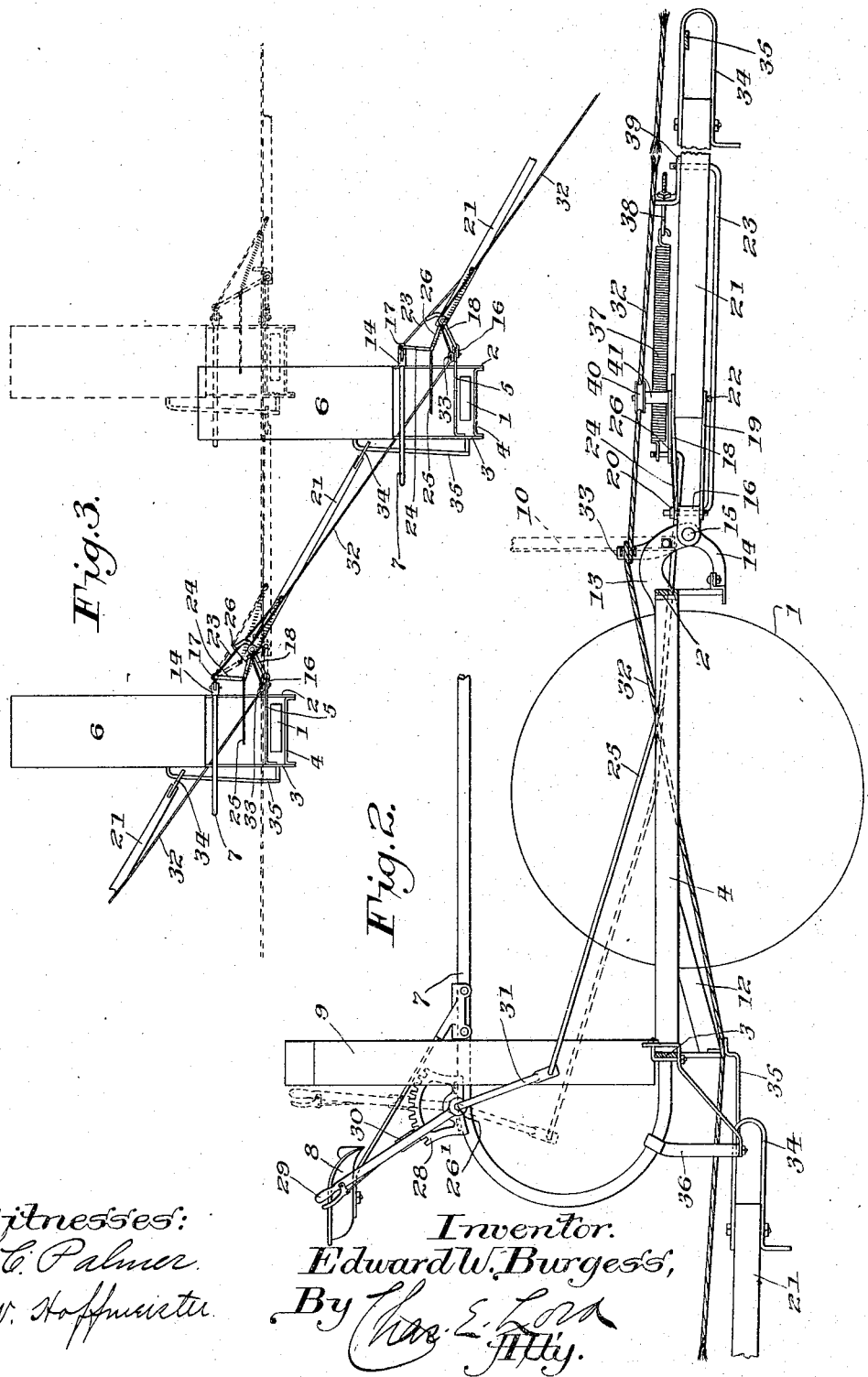

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

DRAFT DEVICE.

1,200,075.

Specification of Letters Patent.

Patented Oct. 3, 1916.

Application filed April 30, 1914. Serial No. 835,368.

*To all whom it may concern:*

Be it known that I, EDWARD W. BURGESS, a citizen of the United States, residing at Chicago, in the county of Cook and State of Illinois, have invented certain new and useful Improvements in Draft Devices, of which the following is a full, clear, and exact specification.

My invention relates to improved draft devices whereby a series of grain harvesters or other implements may be connected together in tandem relation and drawn forward by a single source of power, as by a traction engine having a draft connection with the front machine of the series, and consists in providing improved draft connections between the different units of the series and between the series and the traction power, and steering mechanism carried by each of the units that may be manipulated by an operator upon the machine in a manner to control the line of advance of one unit independent of the others, whereby the units may be drawn in offset or trailing relation in a manner to cut a greater or less width of swath, or to trail in line with each other.

The object of the invention is to provide an improved and simplified draft and steering device that may be controlled in a simple and positive manner for the purpose described and manufactured at small expense, which device includes counterbalancing mechanism operative against the tendency of the side draft of the machines to carry them toward the standing grain, and to assist the operator in manipulating the steering mechanism. These objects are attained by means of mechanism, one embodiment of which is illustrated in the accompanying drawings, in which—

Figure 1 is a top plan view of the wheel frame of a grain harvester and a part of the grain platform sufficient to illustrate the manner of connecting and operating the steering mechanism; Fig. 2 is a side elevation of Fig. 1; and Fig. 3 is a top plan view on a reduced scale illustrating the operation of the draft devices when applied to a series of harvesters operating in tandem or offset relation.

Referring to the drawings, wherein the same reference numerals designate like parts throughout the several views, 1 represents the harvester traction wheel, 2 and 3 the front and rear members, respectively, of the wheel frame, 4 and 5 longitudinal members of the wheel frame at the stubbleward and grainward side of the traction wheel, respectively, 6 a part of the grain platform and representing the delivery end thereof, 7 a seat supporting member rigidly attached to the members 2 and 3 in the usual manner, 8 an operator's seat carried by the member 7, 9 a part of the elevator frame at the rear side of the harvester, 10 a vertical member of the frame structure at the front of the harvester, and 11 and 12 front and rear brace members, respectively, connecting the member 5 of the wheel frame with the members 2 and 3 thereof; all of these parts being common in the class of machines indicated.

13 represents a draft member, preferably integral with the wheel frame member 5, and 14 a draft member secured to the front side of the grain platform near the delivery end thereof, and spaced apart grainwardly from the member 13. The draft members 13 and 14 are provided with laterally disposed alined openings that receive coupling pins 15 whereby draft clevises 16 and 17 are connected therewith in a manner permitting the clevis members to swing in a vertical plane when the harvester is tilted about the axis of the traction wheel. The clevis members are provided with vertically disposed openings in front of their pivotal connection with the draft members, and 18 and 19 represent upper and lower links, respectively, having their rear ends pivotally connected with the clevis member 16 by means of a pin 20, and their front ends pivotally connected with the rear end of a steering tongue 21 by means of a vertically disposed pin 22, and 23 represents a diagonally disposed draft member having its rear upturned end pivotally connected with the clevis member 17, and its front upturned end with the steering tongue 21.

24 represents a transversely disposed toggle bar having its grainward end provided with an opening that receives the upturned rear end of the draft member 23, and its opposite end with an opening that receives the upturned end of an adjusting link 25, and 26 represents a coacting toggle bar having its grainward end provided with an opening that receives the upturned end of the link 25, and its opposite end with an opening that receives the pin 22, whereby the rear end of the steering tongue 21 is flexibly connected with the draft clevis 17.

26¹ represents a transversely disposed rock shaft having its stubbleward end journaled in a bearing 27 carried by the elevator frame, and its opposite end in a bearing integral with a toothed sector 28 secured to the seat supporting member 7. The grainward end of the rock shaft has secured thereto a hand lever 29, within convenient reach of an operator in the seat, and provided with a common form of sliding detent mechanism 30 that coöperates with the sector in securing the lever in any desired position of adjustment, and 31 represents a depending arm at the opposite end of the rock shaft, and preferably integral therewith, and pivotally connected with the rear end of the link 25, whereby the position of the toggle bars 24 and 26 and steering tongue 21 may be controlled by the manipulation of the hand lever.

The series of machines are drawn by means of sections of cable 32, having eyes at their opposite ends whereby they are connected with the draft member 13 by means of a supplemental draft member 33 secured thereto.

In operation the front end of the cable drawing the forward end of the series of harvesters is connected with the draft power of a traction engine (not shown), and its rear end with the draft member 33, and the remaining units are connected by means of the other sections of the cable, having their opposite ends connected with the draft member 33 upon each unit, as shown in Fig. 3. The front end of the steering tongue is provided with a clevis 34 whereby it is connected with a transverse bar 35 disposed in rear of the wheel frame and grain platform, and preferably spaced apart therefrom rearwardly and having its opposite ends turned toward the front of the machine and secured to its frame members, and 36 represents a truss member having one end secured to the seat supporting member 7 and its opposite end to the stubbleward end of the bar 35. The steering tongue 21 is free to swing laterally upon the bar 35 when adjusted in opposite directions, and the cable sections 32 and steering tongue and its clevis connection 34 are so proportioned in length as to cause the cable sections alone to draw the series of machines forward, the steering tongue and other adjusting means being operative to control the path of advance of the several units.

In the operation of draft devices of the kind indicated, as heretofore constructed, it has been found that to adjust the steering mechanism in a direction to permit the machine to move grainward was relatively easy, because the tendency of the side draft of the machine was to move it in that direction; but when it was desired to move the tongue in an opposite direction laterally to draw the machine stubbleward, as when turning a corner of the field, which required much power, the manually operative means for that purpose was necessarily slow in its movement. To move said tongue and enable the operator to easily and quickly adjust the steering mechanism in opposition to the side draft of the machine I provide a counterbalancing mechanism including a coiled tension spring 37, having its rear end connected with the upturned end of the link 25 and its opposite end with an I-bolt 38 that is longtudinally adjustable in a clip member 39 that is pivotally connected with the upturned end of the draft member 23, whereby the tension of the spring may be regulated as required for machines having variable widths of cut; and I also provide other counterbalancing means that may be used either singly or supplemental to the spring counterbalancing mechanism, comprising a sheave 40 carried by the rear end of the steering tongue 21 and adjustable laterally relative thereto by being mounted upon the laterally turned end of the link 18, that is provided with a series of spaced openings to receive a stud 41, upon which the sheave 40 is journaled. The draft cable 32 is received by the sheave 40, and when the tongue is moved laterally about its pivotal connection with the draft member 23 and link 18 in a direction permitting the harvester to move grainward, the cable is warped grainward as shown by dotted lines in Fig. 1. When it is desired to move the tongue in an opposite direction the draft force upon the cable assists the operator when he manipulates the hand lever to throw the toggle bars toward the position shown by full lines in Fig. 1 and counterbalances the tendency of the side draft of the machine to carry the tongue in an opposite direction, and the sheave 40 may be adjusted laterally for the purpose of utilizing more or less of the draft force as it is required to counterbalance machines having variable widths of cut, or the different units of a series as they are positioned in the trailing line, the draft force upon each section of the coupling being progressively less than from the front to the rear machine of the series. The counterbalancing spring may be attached to the line or it may coact with the draft, or the draft line may be utilized as the counterbalancing force.

Having shown and described a preferred structure embodying my invention, I do not wish that it be confined to the precise details of construction as shown, it being understood that many minor changes may be made both as to form and proportion of parts without departing from the spirit of my invention.

What I claim as being my invention, and desire to secure by Letters Patent, is:

1. In a tandem draft connection, a machine frame, a tongue pivotally connected therewith and movable bodily laterally relative to the line of draft, and means for moving said tongue bodily laterally relative to the line of draft.

2. In a tandem draft connection, a machine frame, a tongue pivotally connected to said frame and movable bodily laterally relative to the line of draft, and means for adjusting laterally the pivot of said tongue as said tongue is moved laterally relative to the line of draft.

3. In a tandem draft connection, a machine frame, a steering tongue pivotally connected to said frame and movable laterally relative to the line of draft, means for adjusting said tongue laterally, a draft member operatively connecting said machine frame with a source of draft power and engaging with said tongue adjacent its axis for returning said tongue to its normal position.

4. In a tandem draft connection, a machine frame, a trailing unit, a steering tongue pivotally connected to said trailing unit and movable laterally relative to the line of draft, means for adjusting laterally the pivot of said tongue as said tongue is moved laterally, and a flexible draft member connecting said machine frame with said trailing unit and connected with said tongue adjacent its axis and movable laterally with the pivot of said tongue.

5. In a tandem draft connection, a machine frame, a draft tongue pivotally connected with the front side of said frame in a manner permitting said tongue to swing laterally relative to the line of draft and to move longitudinally relative to said frame, and means for swinging said tongue laterally and moving the same longitudinally as it swings.

6. In a tandem draft connection, a machine frame, a tongue pivotally connected thereto and movable laterally relative to the line of draft, a toggle connection operatively connected between said tongue and frame, and means operable from said machine frame for adjusting said toggle connection.

7. In combination, a plurality of units, one disposed in front of the other, steering elements connecting said units, separate flexible draft connections between said units, means operable from one of said units to adjust its steering element laterally in one direction, and means connecting said steering element with said flexible draft connection for adjusting said steering element in an opposite direction as said units are moved forward in the field.

8. In combination, a plurality of machine units, one disposed in front of the other, steering elements connecting said units, separate flexible draft elements connecting said units, means operable from one of said units to adjust its steering element laterally, said flexible draft element engaging with said steering element and moving said steering element in one direction as said units are moved forward in the field, and counterbalancing means coöperating with said steering element adjusting means and the flexible draft member to move said steering element in the same direction.

9. In a tandem draft connection, a machine frame, a draft tongue pivotally connected with the front side of said frame in a manner permitting said tongue to swing laterally relative to the line of draft, a diagonally disposed draft member having its rear end pivotally connected with said frame and its front end pivotally connected with said draft tongue, and means for swinging said draft tongue about its connection with said diagonally disposed draft member.

10. In a tandem draft connection, a machine frame, a draft tongue pivotally connected with the front side of said frame in a manner permitting said tongue to swing laterally relative to the line of draft, the connection including a diagonally disposed draft member having its rear end pivotally connected with said frame and its front end pivotally connected with said tongue, a swinging link connection between the rear end of said tongue and said frame, and means for swinging said tongue and link connection laterally.

11. In a tandem draft connection, a machine frame, a draft tongue pivotally connected with the front side of said frame in a manner permitting said tongue to swing laterally relative to the line of draft, and means for swinging said tongue laterally, said means including a toggle connection between the rear end of said tongue and a fixed part of the frame structure.

12. In a tandem draft connection, a machine frame, a draft tongue pivotally connected with the front side of said machine frame, said connection including a swinging link pivotally connected with the rear end of said tongue and said frame, a diagonally disposed draft member having its rear end pivotally connected with said machine frame and its front end pivotally connected with said tongue, and means for swinging said tongue laterally, said means including a toggle bar connection between the rear end of said tongue and a fixed part of the frame structure.

13. In a tandem draft connection, a machine frame, a draft tongue pivotally connected with the front side of said machine frame, said connection including a swinging link pivotally connected with the rear end of said tongue and said frame, a diagonally disposed draft member having its rear end pivotally connected with said frame and its front end pivotally connected with said tongue, a toggle bar connection between the rear end of said tongue and a fixed part of the frame structure, and a hand lever carried by said machine frame and operatively connected with said toggle bar connection whereby said tongue may be turned laterally in opposite directions.

14. In combination, a plurality of machine units disposed one in front of the other, draft connections between said units and between the forward unit and a source of draft power, steering elements connected with said units and coöperating with the draft power in a manner to maintain said machine units at a predetermined angle relative to the line of draft, and means for adjusting said steering elements whereby the operative angle of said machine units may be varied, said means including a counterbalancing mechanism operative to yieldingly resist an adjusting movement thereof in one direction.

15. In a tandem draft connection, a machine frame, a draft tongue pivotally connected with said machine frame in a manner permitting said tongue to swing laterally relative to the line of draft, operative connections between said frame and said tongue for swinging said tongue laterally, and a counterbalancing spring mechanism connected with said tongue adjusting mechanism and coacting therewith to swing said tongue in one direction.

16. In a tandem draft connection, a machine frame, a steering tongue pivotally connected with said machine frame in a manner permitting said tongue to swing laterally relative to the line of draft, operative connections between said frame and said tongue for swinging said tongue laterally, and a tension spring connecting the tongue swinging connections with said tongue and coacting therewith to swing said tongue in one direction.

17. In a tandem draft connection, a machine frame, a tongue pivotally connected thereto and movable laterally relative to the line of draft, a toggle connection operatively connected between said frame and tongue, means operable from said machine frame for adjusting said toggle connection, and counterbalancing means operatively connected between said toggle and said tongue.

18. In a tandem draft connection, a machine frame, a tongue pivotally connected thereto and movable laterally relative to the line of draft, a toggle connection operatively connected between said frame and tongue, means operable from said machine frame for adjusting said toggle connection, and resilient means operatively connected between said toggle and said tongue normally resisting movement of the former in one direction.

19. In a tandem draft connection, a machine frame, a draft tongue pivotally connected with the front side of said machine frame, said connection including a swinging link pivotally connecting the rear end of said tongue with said frame, a diagonally disposed draft member having its rear end pivotally connected with said frame and its front end pivotally connected with said tongue, a toggle bar connection between the rear end of said tongue and a fixed part of the frame structure for actuating said toggle mechanism in opposite directions whereby said tongue may be turned laterally, and a counterbalancing spring mechanism coacting with said toggle actuating mechanism.

20. In a tandem draft connection, a machine frame, a draft tongue pivotally connected with the front side of said frame in a manner permitting it to swing laterally relative to the line of draft, said connection including a swinging link pivotally connecting the rear end of said tongue with said frame, a diagonally disposed draft member having its rear end pivotally connected with said frame and its front end pivotally connected with said tongue, a laterally disposed toggle bar mechanism connecting the rear end of said tongue with said frame, mechanism carried by said frame and operative to actuate said toggle bar mechanism in opposite directions whereby said tongue may be turned laterally, and a coiled counterbalancing tension spring having one end connected with said toggle mechanism and its opposite end with said tongue.

21. In a tandem draft connection, a series of machines, steering and draft connections between said machines adapted to draw them in tandem and offset relation, said connections including a steering tongue having its rear end pivotally connected with the front side of one machine frame in a manner permitting said tongue to swing laterally relative to the line of draft and its front end carried by the rear side of a forward machine frame in a manner permitting said tongue to swing freely laterally thereon, and flexible draft connections between the front sides of said machine frames operative independent of said steering tongue to draw said series of machines forward.

22. In a tandem draft connection, a series of machines, steering and draft connections between said machines adapted to draw them in tandem and offset relation, said connections including a steering tongue having its rear end pivotally connected with the front side of one machine frame in a manner permitting it to swing laterally relative to the line of draft, means for adjusting said tongue laterally, the front end of said tongue being carried by the rear side of the forward machine frame in a manner permitting said tongue to swing freely laterally thereon, and flexible draft connections between the front sides of the series of machine frames operative independent of the steering tongue to draw the series of machines forward and coacting with said adjusting means whereby the draft assists in swinging the tongue laterally in one direction.

23. In a tandem draft connection, a machine frame, a draft tongue pivotally connected with the front side of said machine frame in a manner to swing laterally relative to the line of draft, said connections including a swinging link pivotally connecting the rear end of said tongue with said frame, a diagonally disposed draft member having its rear end pivotally connected with said frame and its front end pivotally connected with said tongue, means for swinging said tongue laterally in opposite directions about its pivoted connection with said draft member and said link, and a flexible draft member having its front end connected with a source of power and its rear end with the front side of said frame and engaging with the rear side of said tongue whereby the draft force is utilized to counterbalance the steering mechanism.

In testimony whereof I affix my signature, in the presence of two witnesses.

EDWARD W. BURGESS.

Witnesses:
F. W. HOFFMEISTER,
C. M. OBERBECK.

Copies of this patent may be obtained for five cents each, by addressing the "Commissioner of Patents, Washington, D. C."